United States Patent [19]

Turano

[11] Patent Number: 4,867,102
[45] Date of Patent: Sep. 19, 1989

[54] THERMOELECTRIC AQUARIUM COOLING UNIT

[76] Inventor: Rona Turano, 203 Appleton St., Cambridge, Mass. 02138

[21] Appl. No.: 268,016

[22] Filed: Nov. 7, 1988

[51] Int. Cl.⁴ .................... A01K 61/00; F25B 21/02
[52] U.S. Cl. ........................................ 119/2; 62/3.2; 119/5
[58] Field of Search .................. 119/5, 2; 62/3

[56] References Cited

U.S. PATENT DOCUMENTS

| | | | |
|---|---|---|---|
| 3,146,195 | 8/1964 | Berardi | 119/5 X |
| 3,174,291 | 3/1965 | Crawford et al. | 62/3 |
| 3,254,494 | 6/1966 | Chartouni | 62/3 |
| 3,296,806 | 1/1967 | Gonzalez | 62/3 |
| 3,465,718 | 9/1969 | Handman et al. | 119/2 |
| 3,557,753 | 1/1971 | Dantoni | 119/5 X |
| 3,855,970 | 12/1974 | Harwood | 119/5 |

Primary Examiner—Lloyd L. King

[57] ABSTRACT

An aquarium cooling unit comprising a thermoelectric cooling device and a thermostat for regulating the temperature of an aquarium. In one embodiment the cooling unit is in conjunction with a heat pipe. In another embodiment the cooling unit is built into the wall of an aquarium filtration unit.

5 Claims, 2 Drawing Sheets

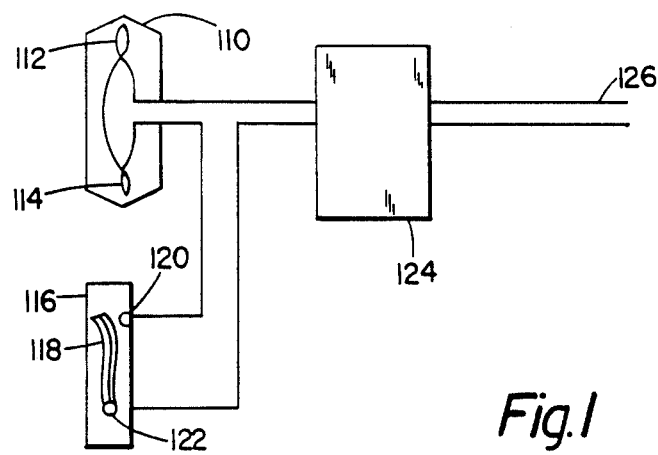
Fig.1
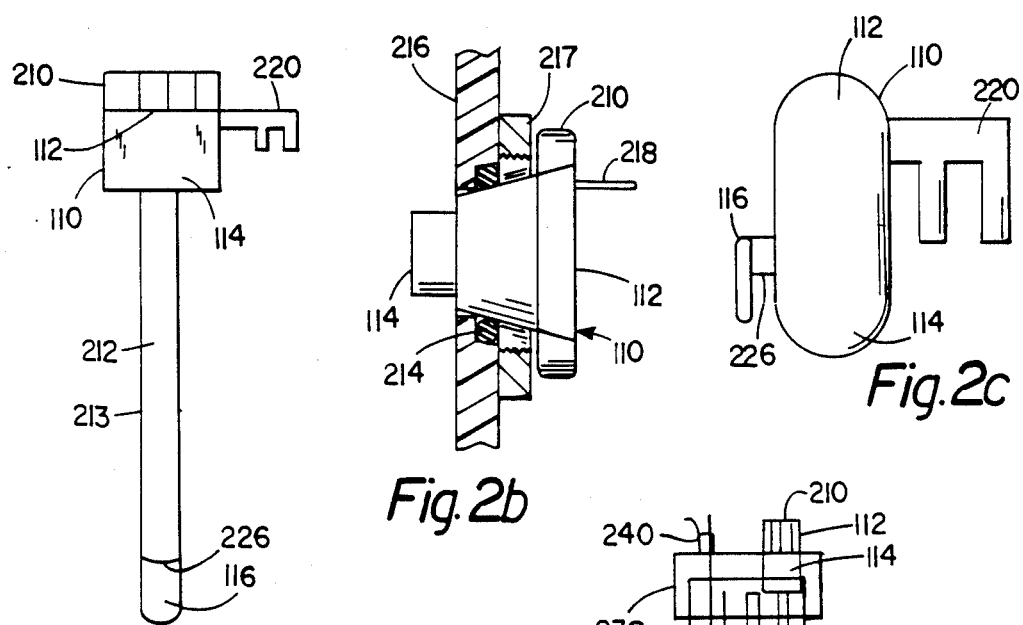
Fig.2a
Fig.2b
Fig.2c
Fig.2d

THERMOELECTRIC AQUARIUM COOLING UNIT

BACKGROUND OF THE INVENTION

This invention relates to temperature control in aquariums.

Aquariums are habitats for a wide variety of aquatic life. While it is common knowledge that some life, for example tropical fish, require heated water for survival, it is less well known that if the water temperature exceeds a certain limit, it is as harmful for the aquatic life as water which is too cold. All one has to consider is that fish life downstream from the cooling water discharge ports of power plants is killed by a rise in temperature that is only a few degrees to understand that a small rise in temperature can be detrimental. Part of the problem stems from the fact that oxygen dissolves in water in amounts that are a function of the water temperature. It is therefore important to maintain the water temperature in an aquarium within a narrow range of temperature.

Although it is relatively easy to provide local heating to raise the temperature of the water in an aquarium to be within the required range, cooling the aquarium has been a problem. Typically no cooling has been provided and the keepers of an aquarium have generally relied on the maintenance of the temperature of the room in which the aquarium is located to provide the required cooling. For rooms without airconditioning, aquarium keepers have resorted to fans or placing ice cubes in the aquarium water, to lower its temperature. However, even for those with airconditioned rooms, it becomes less reasonable to cool the room simply to maintain the temperature of the aquarium, as the cost of electricity increases and electrical shortages appear. It is more reasonable to cool the aquarium alone, rather than to cool the room in which the aquarium is situated.

Previous attempts at cooling the aquarium have required larger refrigeration units than could reasonably be used in a home setting. The patent of Harwood (U.S. Pat. No. 3,855,970) discloses an aquarium which includes a heat exchanger and a refrigeration unit to maintain the temperature. The referigeration unit in this patent included a refrigeration compressor and so this is not the ideal solution for use in the home setting.

The present invention discloses a refrigeration means for an aquarium which is suitable for home use.

SUMMARY OF THE INVENTION

The present invention, in one embodiment, is an aquarium cooling unit in the form of a thermoelectric cooling module with an associated thermostat. The cooling module may take on several physical configurations and may be placed in conjunction with an aquarium heater, an aquarium filter unit, or simply on its own.

BRIEF DESCRIPTION OF THE DRAWING

The present invention may be better understood with reference to the drawing. It is however the intention of the applicant not to limit the invention by the drawing but only to limit the invention by the claims. A description of the drawing is as follows:

FIG. 1 is a schematic diagram of an embodiment of an aquarium cooling unit constructed in accordance with the invention;

FIG. 2 is a series of physical configurations of the embodiment depicted in FIG. 1. FIG. 2(a) is a schematic diagram of the cooling unit with a heat pipe. FIG. 2b is a schematic diagram of the cooling unit as a wall mountable plug. FIG. 2c is a schematic diagram of the cooling unit without a heat pipe. FIG. 2d is a schematic diagram of the cooling unit in conjunction with an aquarium heater;

DESCRIPTION OF THE PREFERRED EMBODIMENT

Figure 3:
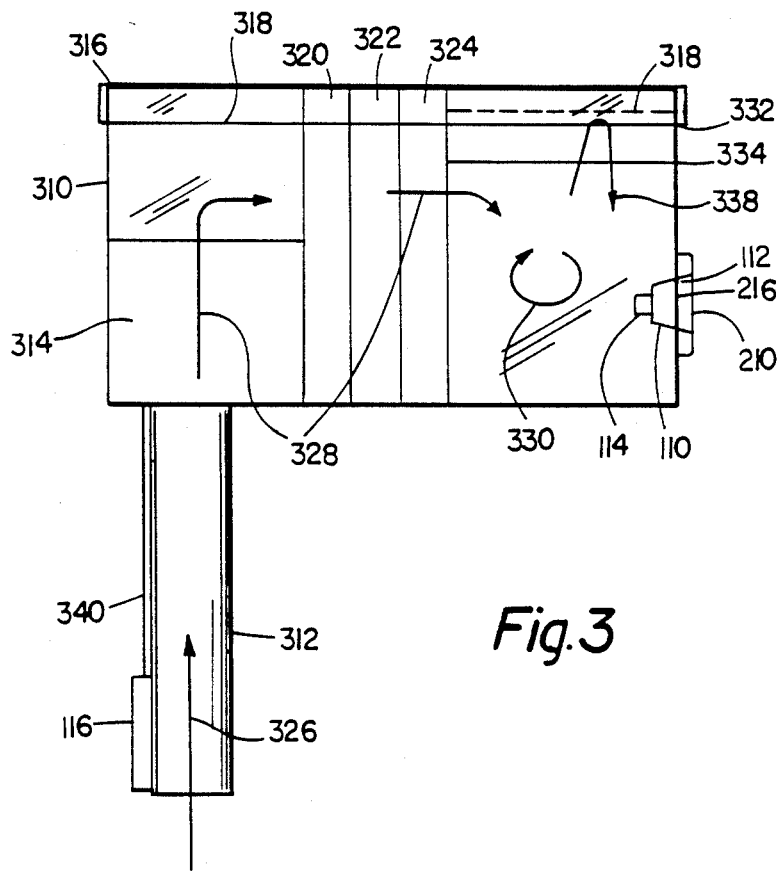
FIG. 3 is a schematic diagram of the embodiment of the invention shown in FIG. 2b depicted as mounted in an aquarium filter unit.

Referring to FIG. 1, the thermoelectric aquarium cooling unit in one embodiment consists of a Peltier device 110 containing within it a hot junction 112 and a cold junction 114. When a dc current is passed through the unit, the hot junction 112 increases in temperature while the cold junction 114 decreases in temperature. It should be stated at this point that by a Peltier device 110, it is meant any device which produces a temperature gradient when current passes through it. Typical Peltier devices are twisted couples of metals of differing electromotive capabilities and solid state semiconductor devices such as produced by Melcor of Trenton, N.J.

The hot junction 112 is placed in air to help dissipate the heat generated while the cold junction is placed in contact with the water of the aquarium. The cold junction 114 may be placed in direct contact with the aquarium water or it may be placed in contact with some thermally conductive device such as a heat pipe which is in turn in contact with the water to be cooled.

It should be noted that even if the type of Peltier device does not have a particularly efficient cold junction, the aquarium may still be effectively cooled since it will not be necessary to cool the aquarium to a great degree in general. Higher efficiency Peltier devices are available if the amount of cooling is extreme.

The remainder of the unit shown in this embodiment consists of a dc power supply 124 which receives power from an ac source 126 and converts it to dc for use with the Peltier device 110. The dc supply 124 must be capable of supplying about 10 amps at about 8 volts for use with the semiconductor devices. The Peltier device is in series with the power supply 124 and a thermostat 116. The thermostat 116 controls the flow of current to the Peltier device 110 according to the temperature it is sensing.

Typically this is done by having the Peltier device attached to one terminal 120 of the thermostat 116. The second terminal 122 is connected to the power supply 124. A bimetallic strip 118 is connected to one of the terminals 120, 122 of the thermostat 116. As the temperature of the thermostat 116 rises the bimetallic strip 118 bends and makes contact with the terminal to which it is not attached, allowing current to flow. As the temperature decreases, the bimetallic strip bends from the terminal breaking the connection and preventing current flow.

Thermostats 116 are generally adjustable so that the temperature at which the bimetallic strip 118 makes contact with the terminal of the thermostat can be varied. This is generally done by moving the strip relative to the terminal so that the strip has less of a distance or more of a distance to bend in order to make contact. It will be apparent to one skilled in the art that the thermostat could be replaced by an electronic relay which uses a thermistor or thermocouple as a sensing element.

Referring to FIG. 2, several physical embodiments of the circuit depicted in the schematic in FIG. 1 are shown. FIG. 2a shows the Peltier device 110 in conjunction with a heat pipe 212 to help transfer heat from a greater depth of water in the aquarium. The heat pipe 212 is in contact with the cold junction 114 of the Peltier device 110, while the hot junction 112 is in contact with a series of radiating fins or ribs 210 to help transfer heat to the air. A mounting bracket 220 holds the cooling unit in position on the aquarium. The thermostat in this embodiment is located at the end of the heat pipe 212 but separated from it by insulation 226. In this way, the thermostat is located at the deepest point in the aquarium, where the cooler water will settle. The heat pipe 212 and the thermostat 116 are enclosed in a waterproof tube 213 to isolate the electrical components of the thermostat 116 and the insulation 226 from the water of the aquarium.

FIG. 2b shows an embodiment of only the Peltier device 110. The thermostat, now shown, is located separately elsewhere in the aquarium. In this configuration the peltier element 110 is in the form of a plug which mounts into a socket 217 built into a wall 216 of the aquarium or filter unit. Water is prevented from leaking around the Peltier unit 110 by an O-ring 214 which is compressed between the peltier device 110 and the wall 216. The cold junction 114 of the device 110 is in contact with the water to be cooled, while the hot junction 112 is exposed to air and is in contact with radiator fins or ribs 210 to aid in heat dissipation. Electrical connections 218 are made through the surface of the device 110 adjacent to the air.

FIG. 2c shows a unit like that of FIG. 2a, but without the heat pipe. The device 110 containing a hot junction 112 and a cold junction 114 is mounted on an aquarium by means of a bracket 220 such that the hot junction 112 is in contact with the air and the cold junction 114 is in contact with the water. When in use, the unit must be positioned such that the thermostat 116, mounted to the outside of the device 110 but separated from the device 110 by thermoinsulation 226, is in contact with the aquarium water. Electrical connections between the device 110 and the thermostat 116 are made through the insulation 226 and are properly shielded from the water.

FIG. 2d shows the unit in conjunction with an aquarium heater. A typical aquarium heater consists of a glass envelope 242 and a plastic cap 238, which contains a heating element 234 and a thermostat 116 containing a bimetallic element 118. The temperature at which the element 118 contacts the terminal 236 of the thermostat 116 which allows current to flow to the heater 234 is adjusted by a control knob 240 projecting through the cap 238. In this embodiment, the thermostat has a second terminal 120 which is located such that if the temperature of the thermostat 116 exceeds a predetermined point, the bimetallic strip 118 makes contact with the second terminal 120, allowing current a flow to the Peltier cooling unit 110.

In this way the thermostat 116 serves as a double pole switch, with the center tap being the bimetallic strip 118, and the two terminals 120 and 236 being the poles of the switch. The center pole is connected to the power supply, while the other poles are connected to the heating and cooling elements. In this way, the heating unit will be powered if the temperature falls below a certain temperature and the cooling unit will function if the temperature rises above a certain value.

In this embodiment, the Peltier unit 110 is mounted on the cap 240 with the hot junction 112 being enclosed in radiator fins 210 to help to dissipate the heat. The cool junction 114 is in contact with a heat pipe 212, which terminates in a thermal mass 230, such as a cylindrical piece of steel, to aid in transferring heat from the water to the cold junction 114 through the envelope 242. The heat pipe 212 is separated from the thermostat 116 by insulation 232 in order to allow the thermostat 116 to monitor the temperature of the water and not the air in the envelope 242.

Referring to FIG. 3, this embodiment of the invention is the embodiment of the invention shown in FIG. 2b mounted to an aquarium filter unit. The aquarium filter unit consists of a water tight container 310 having an inlet tube 312 which is immersed in the aquarium and which is connected to a pump 314. The pump 314 draws the water up (shown by arrow 326) the inlet tube 312 into the container 310. As water fills the container 310 it passes through (shown by arrows 328) a course filter 320, a charcoal filter 322 and an ammonia neutralizer 324. The water mixes (shown by arrow 330) with water in the side of the container opposite the pump 314. The wall on that side of the container has a section removed 332 which allows water to move out a spillway 334 and move back into the aquarium (shown by arrow 338). This arrangement keeps the water level 318 in the container 310 at the level of the opening in the wall 332. The filter unit typically has a cover 316 to prevent outside contaminants from entering the water.

When used with the aquarium filter, the cooling unit 110 is mounted on the wall of the filter 216 such that the cold junction 114 is in contact with the water being mixed (shown by arrow 330) after passing through the ammonia neutralizer 324. The hot junction 112 is mounted so as to be on the outside of the filter container 310. Radiator ribs or fins 210 help to dissipate the heat. The thermostat 116 is located at the lower end of the inlet tube 312 so as to accurately measure the temperature of the aquarium water. The electrical connection to the thermostat 116 is made through a waterproof of tube 340 which allows the electrical connections to the thermostat 116 to be made without contact with the water.

It will be apparent to one skilled in the art that variations and modifications of the embodiments shown are possible which will still be within the scope and spirit of the invention. It is the intent then to limit the invention only by the scope of the claims.

What I claim is:

1. An aquarium cooling unit for an aquarium containing water comprising:
   an aquarium filter unit, adapted to be mounted on a wall of the aquarium, said filter unit comprising:
   i. a reservoir having an inlet disposed to draw water from said aquarium and an outlet disposed to discharge water into said aquarium;
   ii. a pump, said pump disposed so as to draw water from said aquarium through said inlet into said reservoir;
   iii. a filter disposed within said reservoir and located so as to filter said water passing from said inlet to said outlet; and
   a Peltier cooling unit comprising:
   i. a Peltier device having a hot and a cold junction;
   ii. a d.c. power supply adapted to supply current to said Peltier device;

iii. a temperature control device, disposed so as to measure the temperature of the aquarium water and to control the current supplied to said Peltier device said temperature control device responsive to the temperature of said aquarium water so as to permit current flow to said Peltier device when said temperature of said water is above a desired temperature and to not permit current flow otherwise;

said Peltier device located such that said cold junction is in contact with the water located in said reservoir and in such a position as to cool said water prior to the water being returned to the aquarium through said outlet.

2. The cooling unit of claim 1 wherein said temperature control device is a thermostat.

3. The cooling unit of claim 2 wherein said thermostat is positioned so as to measure the temperature of water flowing into said filter unit.

4. The cooling unit of claim 2 wherein said thermostat is positioned so as to measure the temperature of water within the aquarium.

5. An aquarium cooling unit for an aquarium containing water comprising:

an aquarium heating unit, said heating unit comprising a heating element and a temperature control device, said device responsive to the temperature of the water within the aquarium so as to permit current to flow into said heating element when said water temperature is less than a desired temperature and to not permit current flow otherwise;

a Peltier device, having a hot and a cold junction, said device disposed substantially adjacent to said heating element; and a d.c. power supply adapted to supply current to said Peltier device, said temperature control device responsive to said water temperature so as to permit said current flow to said Peltier device when said temperature of said water is above a desired temperature and to not permit current flow otherwise, said Peltier device oriented such that said cold junction is in contact with said water and said hot junction is in contact with air.

* * * * *